Dec. 15, 1959 B. GRANT 2,917,699

ALTERNATORS AND/OR ASSOCIATED FILTER NETWORKS

Filed March 31, 1955 3 Sheets-Sheet 1

INVENTOR
BRAHAM GRANT
BY Rines and Rines
ATTORNEYS

ALTERNATORS AND/OR ASSOCIATED FILTER NETWORKS

Filed March 31, 1955 3 Sheets-Sheet 2

INVENTOR
BRAHAM GRANT
BY
Rines and Rines
ATTORNEYS

FIG. 9.
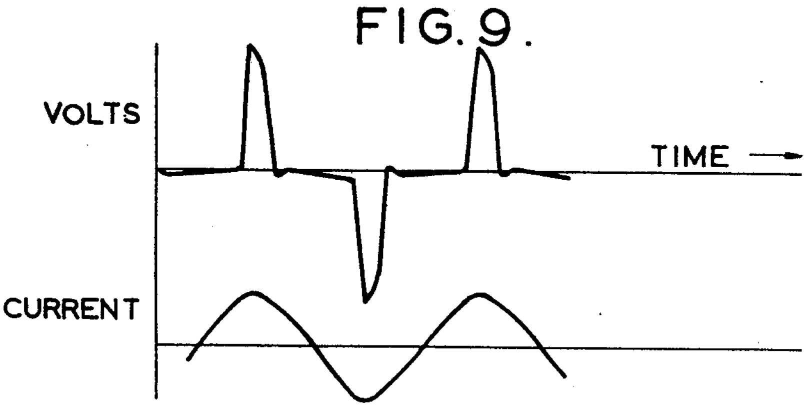
FIG. 10.
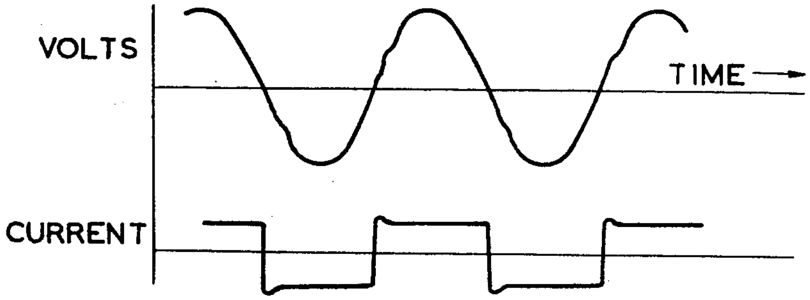
FIG. 12.
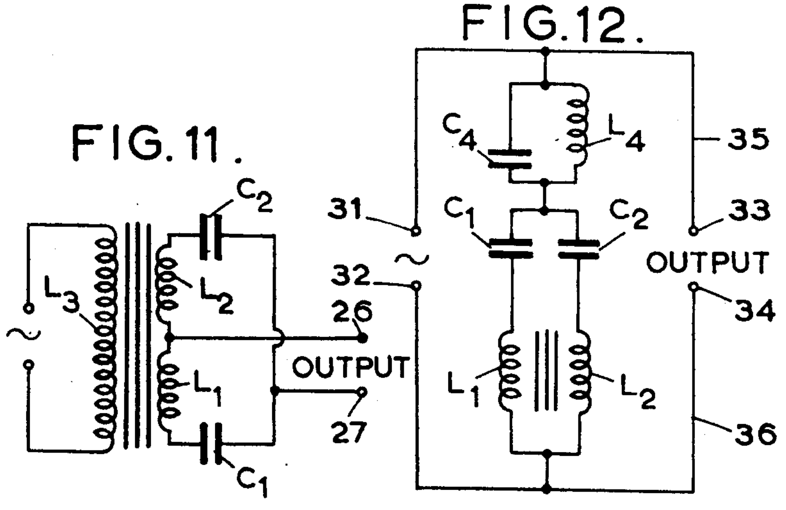
FIG. 11, FIG. 12
INVENTOR
BRAHAM GRANT
BY Rines and Rines
ATTORNEYS

United States Patent Office 2,917,699

Patented Dec. 15, 1959

2,917,699

ALTERNATORS AND/OR ASSOCIATED FILTER NETWORKS

Braham Grant, Edgware, England, assignor to De Havilland Propellers Limited, Hatfield, England Application March 31, 1955, Serial No. 498,377

Claims priority, application Great Britain May 24, 1954

6 Claims. (Cl. 322—58)

Figure 1:
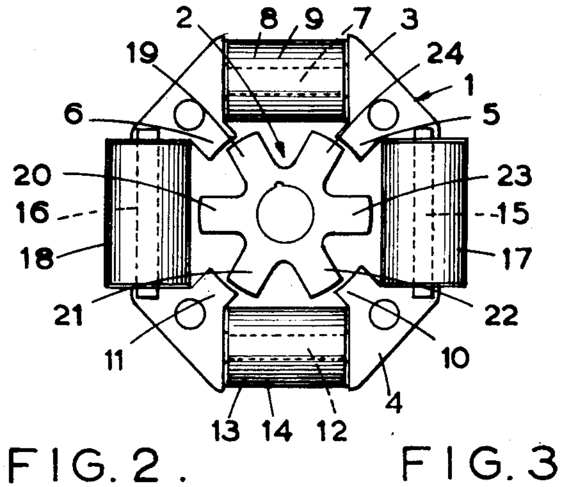

This invention relates to electrical filters and particularly to filters associated with alternators of a small size and operating at high frequency for use on aircraft, or the like. A difficulty experienced with alternators is that where a large part of the load is represented by non linear resistances such as rectifiers or saturable magnetic devices the output voltage waveform becomes very distorted and load devices that require a substantially pure waveform for their operation cannot easily be used. This difficulty is very marked in small high frequency alternators where the output windings have a relatively high inductance. This difficulty can be overcome by using a complicated filter network in the alternating current supply to devices requiring a pure waveform but in practice such a filter is of large volume and mass. The main object of the present invention is to provide an effective filter network small in size and light in weight for association with an alternator to enable a large proportion of the alternator output to be used for non linear loads without substantial distortion of the output voltage waveform. A further object of the invention is to provide a filter whose operation is independent of reactance or changes in reactance in the load circuit fed through the filter.

In accordance with the broad aspect of the present invention a two terminal high pass filter comprises a pair of inductors having different values of inductance inductively coupled together with a coupling coefficient of substantially unity, and two capacitors, connected together between the terminals of the filter as two parallel circuits each including one inductor and one capacitor in series, the inductors being so coupled that from the point of view of current circulating around the two circuits the mutual inductance acts oppositely to the self inductance of the inductors. It is preferred that the ratio of the square roots of values of self inductance of the inductors in the first and second of the parallel circuits is equal to the ratio of the capacitances of the capacitors in the second and first circuits respectively and it is necessary that this ratio should be considerably different from unity. If $L_1$ and $C_1$ and the values of self inductance and capacitance in the first circuit and $L_2$ and $C_2$ are the values for the second circuit the impedance of the filter closely approaches zero for values of frequency in the close neighbourhood of the value $f_0$ given by $$\frac{1}{2\pi}\sqrt{\frac{1}{L_1C_1+L_2C_2}}$$

and at frequencies more than double this value. At frequencies lower than $f_0$ the impedance approaches infinity whilst at a frequency $f_1$ given by $$\frac{1}{2\pi(\sqrt{L_1}+\sqrt{L_2})}\sqrt{\frac{C_1+C_2}{C_1C_2}}$$

the impedance reaches infinity. The frequency $f_1$ must be greater than $f_0$ but with selection of the value of the said ratio the impedance can be arranged to approach zero at the frequency $2f_0$ and all higher frequencies. When dealing with an alternating supply whose frequency is constant the filter according to the invention is arranged so that $f_0$ corresponds to the frequency of the supply with the result that at frequency $f_0$ and all harmonics of the supply frequency the filter impedance is very close to zero. It is preferred that the said ratio should be greater than 5 in order that the impedance approaches zero substantially at a frequency $2f_0$. Further it is preferred that the inductances of the filter should comprise alternator windings.

Figure 4:
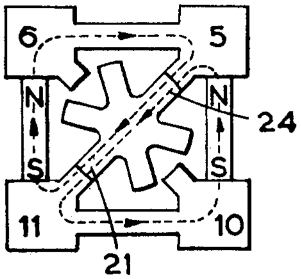
Figure 5:
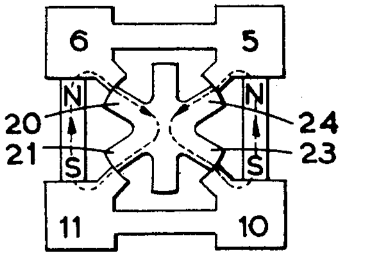
Figure 6:
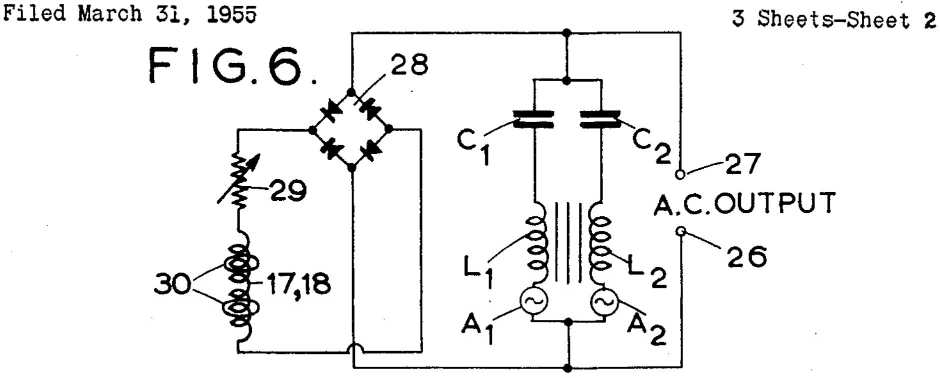
Figures 7, 8:
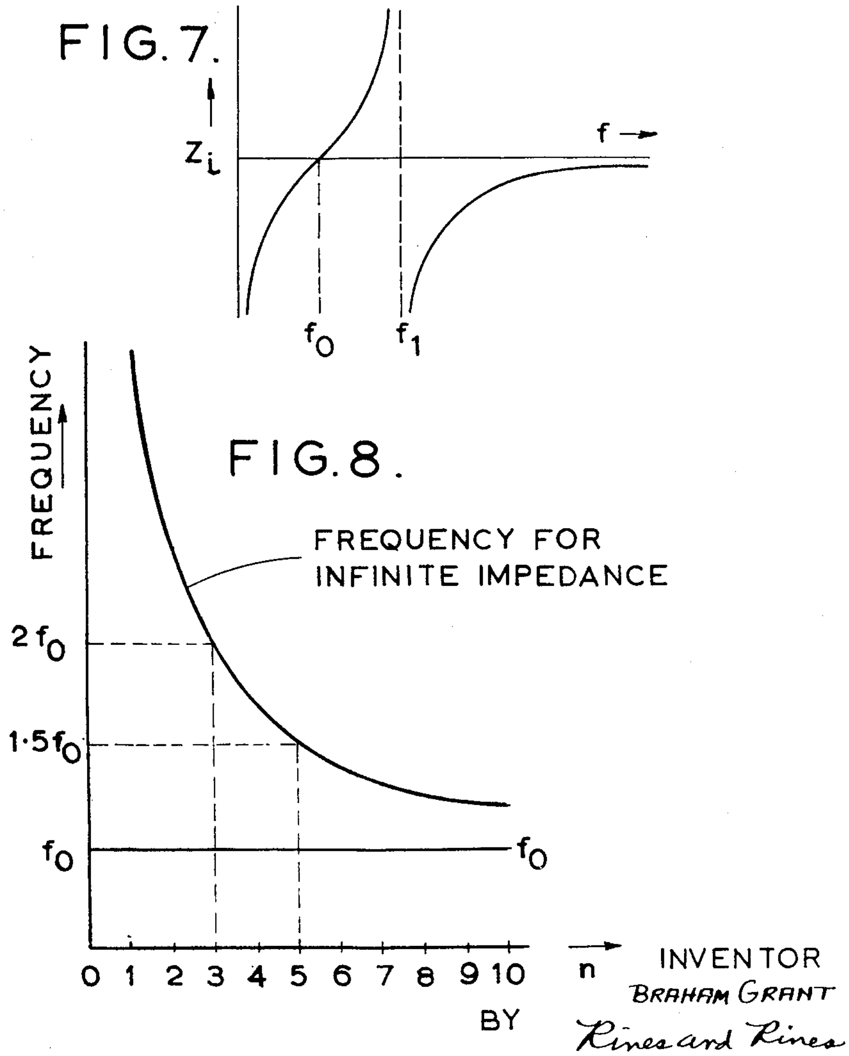

In order that the invention may be clearly understood various embodiments thereof will be described with respect to the accompanying drawings in which:

Figure 1 is an end elevation of an inductor alternator whose windings form the inductances of the filter, Figures 2 to 5 are diagrammatic views of the alternator of Figure 1 showing the paths of magnetic flux, perfect conditions being assumed, i.e., magnetic flux being neglected, Figure 6 is a circuit diagram of the alternator of Figure 1 incorporating capacitors, Figure 7 is a graph showing variation of impedance with frequency of the circuit of Figure 6, Figure 8 is a graph showing the variation of the infinite impedance point with variation of the capacitance ratio for a filter designed for a particular fundamental frequency $f_0$.

Figure 9 is a graph of the voltage and current output wave forms of a conventional alternator with a single capacitor for power factor correction when substantially the whole load is fed through a full wave rectifier, Figure 10 is a graph of voltage and current output of an alternator as described in Figures 1 to 6 when substantially the whole load is fed through a full wave rectifier, Figure 11 is a circuit diagram of a further form of filter, and Figure 12 is a circuit diagram of a still further form of the filter.

Referring to Figures 1 to 6 the inductor alternator shown comprises a stator 1 and a rotor 2. The stator comprises two sets of iron laminations 3 and 4, the set 3 having two pole pieecs 5 and 6 and a core 7 to receive windings 13 and 14. The two sets of iron laminations are spaced by means of two further sets of laminations 15 and 16 which form cores for energising windings 17 and 18.

The laminations 15 and 16 include also one or two laminations of permanent magnet steel which serve to provide initial energisation of the alternator. The rotor 2 is if iron lamniations and has six poles 19, 20, 21, 22, 23 and 24 equally spaced angularly about its axis of rotation. The operation of the alternator is on the well known inductor principle in which the rotor in effect forms a magnetic switch during rotation to effect flux change through cores 7 and 12.

The exact operation is shown diagrammatically in Figures 2, 3, 4 and 5 and it will be seen that the width of the pole pieces has an important effect on wave form.

Figure 2:
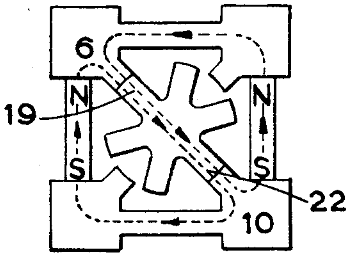
Figure 3:
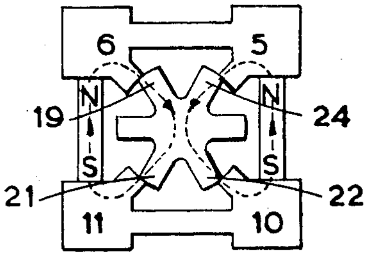

In Figure 2 two opposed poles 19 and 22 are directly opposite poles 6 and 10 and magnetic flux from cores 15 and 16 will pass as shown through the rotor and through core 7 to 12 in a direction from right to left. The rotor is assumed to be rotating in a clockwise direction. Figure 3 shows the position after the rotor has moved through 15°. Here rotor poles 19, 24, 22 and 21 each half engage stator poles 6, 5, 10 and 11 with the result that the flux from cores 15 and 16 passes only through the rotor and no flux passes through cores 7 and 12. Figure 4 shows the position after another 15° of rotation. Rotor poles 24 and 21 now coincide with stator poles 5 and 11 forming a path for the flux from core 15 and 16 through the rotor and through cores 7 and 12 but this time from left to right. Figure 5 shows the position after another 15° of rotation when rotor poles 20, 24, 23 and 21 now half coincide with stator poles 6, 5, 10 and 11 respectively with the result that all flux from the cores 15 and 16 pass through the rotor only and none passes through cores 7 and 12. For another 15° of rotation the position of Figure 2 will again be established except that the whole rotor will be advanced by 60°. Thus for each complete revolution of the rotor six complete cycles of flux variation through cores 7 and 12 will have been achieved. Slight shaping of the co-operating stater and rotor poles in well known manner very simply enables the wave form of flux variation to be approximately sinusoidal and may at the same time ensure that there is substantially no flux variation in cores 15 and 16. It is possible that sub harmonics of the alternating current might be generated as a result of mechanical imperfections in the rotor but in operation it is found that such sub harmonics are damped by the circulating current through the alternator windings and capacitors.

Figure 6 shows the basic circuit diagram of the alternator windings. Winding $L_1$ is formed by coil 8 and coil 13 whilst winding $L_2$ is formed by coil 9 and coil 14. Thus each of the windings $L_1$ and $L_2$ are in halves and a half of each winding is located on each core 7 and 12. By this means it is possible to achieve a coupling factor of substantially unity between windings $L_1$ and $L_2$. As shown in Figure 6 the windings $L_1$ and $L_2$ are connected together at one end to one A.C. output terminal 26 and in order to obtain the coupling between windings $L_1$ and $L_2$ it is necessary that these windings from terminal 26 should be in the same direction around core 7 and 12. By this arrangement when considering current circulating around the circuit including $L_1$ and $L_2$ the mutual inductance acts in opposition to the self inductance of $L_1$ and $L_2$. To show that alternating voltages are generated in windings $L_1$ and $L_2$ two sources of alternating voltage $A_1$ and $A_2$ are shown respectively in series with windings $L_1$ and $L_2$. From the other A.C. output terminal 27 two capacitors $C_1$ and $C_2$ are connected respectively to the other ends of windings $L_1$ and $L_2$. These capacitors perform two functions the first being that of power factor correction of the alternator output and the second being to complete a filter network with $L_1$ and $L_2$ to ensure a sinusoidal voltage wave form of the A.C. output.

To energise the windings 17 and 18 of the alternator part of the A.C. output is rectified by a full wave rectifier 28 and fed to the windings 17 and 18 through a variable resistance 29. The resistance 29 is adjusted by means, not shown, sensitive to the output voltage to vary current through energising coils 17, 18 in such a way as to maintain the output voltage substantially constant. The means for adjusting resistance 29 is well known and further description is thought unnecessary since it is not a feature of the invention that the output voltage is maintained constant. The tendency for flux variation at the alternating frequency in the energising coils 17 and 18 may be reduced by including a shorted turn 30 on each coil.

It may be shown theoretically that the impedance of the circuit formed by inductors $L_1$ and $L_2$ and capacitors $C_1$ and $C_2$ is $$\frac{1-w^2(L_1C_1+L_2C_2)}{jw(C_1+C_2)\left(1-w^2(L_1+L_2-2M)\frac{C_1C_2}{C_1+C_2}\right)}$$

where $w=2\pi f$, $f$ being the frequency of operation and M being the mutual inductance between $L_1$ and $L_2$ in the direction specified. From this formula it can be shown that at a frequency $f_0$ given by $$\frac{1}{2\pi}\sqrt{\frac{1}{L_1C_1+L_2C_2}}$$

the impedance is zero and at a frequency $f_1$ given by $$\frac{1}{2\pi}\sqrt{\frac{C_1+C_2}{C_1C_2(L_1+L_2-2M)}}$$

the impedance is infinite. At frequencies higher than $f_1$ the impedance approaches zero asymptotically. A graph showing the relation between impedance and frequency is shown in Figure 7. In order for the filter to be as effective as possible for frequencies above $f_1$ it is necessary to use particular values of capacitance and of inductance for a particular fundamental frequency $f_0$. These values may be obtained by working out mathematically the ratio $f_1/f_0$. It is found that $$\frac{C_2}{C_1}=\sqrt{\frac{L_1}{L_2}}$$

for this condition. This ratio is referred to as $n$. Figure 8 shows the ratio $n$ plotted against multiples of the fundamental frequency $f_0$. From this it can be seen that if $n$ is at least 5 then the frequency of infinite impedance $f_1$ is down to $1.5f_0$ and it is then found that at frequencies of $2f_0$ and higher the impedance of the filter is very small. Since the inductances are arranged as alternator windings then the filter as such generates alternating current and frequency $f_0$ of the filter is arranged to coincide with the frequency of the alternator.

To demonstrate the effectiveness of the filter there is shown in Figure 9 the wave forms of current and voltage of an inductor alternator having only one winding and power factor correction condenser where the load was fed almost entirely through a full wave rectifier feeding into an inductance. The voltage is so distorted that other load apparatus requiring a substantially pure sinusoidal wave form can not be used. If the alternator is wound with two windings and two capacitors are used as described the voltage wave form for the same load fed through the load referred to above becomes substantially sinusoidal as illustrated in Figure 10. At the same time it will be seen that the current wave form is rather square in shape showing that the actual load is fed more efficiently. With the corrected voltage wave form it is possible to supply any alternating current load device which requires a substantially pure wave form for successful operation. The action of the filter is that for all harmonics of the fundamental frequency generated in the A.C. circuit externally of the alternator a very low impedance path exists through the filter. Reactive loads connected to the A.C. output have no effect on the operation of the filter.

Referring now to Figure 11 a further application of the filter in accordance with the invention is shown. Here the two inductors $L_1$ and $L_2$ are wound on to a transformer core and form two transformers secondary windings. The primary winding $L_3$ is fed from an alternating current mains supply. The windings $L_1$ and $L_2$ provide an output at terminals 26 and 27. As before the windings $L_1$ and $L_2$ are wound in the same direction from the point of common connection at terminal 26 and capacitors $C_1$ and $C_2$ are connected between the other ends of windings $C_1$ and $C_2$ and the output terminal 27. The inductances and capacitances of the windings and capacitors are chosen so that the frequency $f_0$ given by $$\frac{1}{2\pi}\sqrt{\frac{1}{L_1C_1+L_2C_2}}$$

is the fixed frequency of the A.C. mains supply. By suitable choice of the ratio $n$ given by $$\frac{C_2}{C_1} \text{ and } \sqrt{\frac{L_1}{L_2}}$$

as previously described with respect to Figure 8 it is possible to arrange that at frequencies of $2f_0$ and higher the impedance presented between terminals 26 and 27 to currents in an external circuit is very low. It follows that when a load is fed through a rectifier or is otherwise non linear the resulting harmonics generated will be short circuited by the filter $L_1$, $L_2$, $C_1$, $C_2$, and thus the voltage wave form at terminals 25, 26 and 27 will remain substantially sinusoidal. The values of $L_1$, $L_2$, $C_1$ and $C_2$ will take into account the reflected impedance of the alternator supplying the transformer primary and will be larger or smaller depending on the transformer ratio.

In the two previously described embodiments the filter has been arranged as a generator of alternating voltage by varying magnetic flux in a sinusoidal manner through windings $L_1$ and $L_2$. In this way the filter can not act to short circuit the generated current and the fact that the filter has a zero impedance at frequency $f_0$ is no disadvantage, in fact it is a great advantage since the terminal voltage will not vary with the load. However if it is desired to use the filter to prevent distortion of an alternating voltage wave form it is necessary to use values of capacitance and inductance whereby $f_0$ corresponds to or is slightly lower than the fundamental frequency of the alternating voltage given now for convenience as $f_s$. At second and higher harmonics of $f_s$ the filter impedance will be substantially zero. This means that at the frequency $f_s$ the impedance may be low or zero and a short circuit might be formed. This can be avoided by providing a parallel inductance and capacitance circuit resonant at frequency $f_s$ in series with the filter.

Such an arrangement is shown in Figure 12. Here input terminals 31 and 32 and output terminals 33 and 34 are provided, these terminals being connected directly together by conductors 35 and 36 so that the input is directly connected to the output. Between conductors 35 and 36 are connected the filter of the invention comprising $L_1$, $L_2$, $C_1$, $C_2$ and a parallel resonant circuit comprising inductor $L_4$ and capacitor $C_4$. The inductance and capacity values are such that $$f_s=\frac{1}{2\pi\sqrt{L_4C_4}}$$

so that at $f_s$ the parallel resonant circuit presents a substantially infinite impedance. The values of inductance and capacity for the filter should be such that $f_s$ lies between $f_0$ and $f_1$. Current flow through the filter at frequency $f_s$ is thus prevented whilst at harmonics of $f_s$ both the parallel resonant circuit and the filter have a low impedance, thus short circuiting these harmonics and keeping the voltage wave form substantially sinusoidal. Output circuit reactance can again have no effect on the filter operation.

The arrangement of Figure 12 is particularly for use where the alternating supply frequency is not absolutely constant and may vary slightly since the parallel resonant circuit will present a comparatively high impedance for small changes in $f_s$. If $f_s$ is maintained constant it is possible to design the filter so that $f_1$ corresponds to $f_s$ and accordingly the filter had infinite impedance at $f_s$. All harmonics of $f_s$ will then find a low impedance path through the filter and the wave form will remain substantially sinusoidal. With this arrangement the parallel resonant circuit formed by $L_4$ and $C_4$ is no longer necessary.

Whilst it is desirable in any described embodiments of the invention to arrange that $f_1/f_0$ should be reduced to the minimum value by careful adjustment of the values of inductance and capacitance to arrive at a desired value of the ratio $n$, it may be found in some cases that the filter may be effective for a specific purpose without such careful adjustment. In all cases the graph connecting impedance and frequency will be of the general form shown in Figure 7 but the ratio $f_1/f_0$ will of course vary with different relative values of inductance and capacitance. However in all cases the impedance approaches zero at frequencies higher than $f_1$ may therefore be put to any normal use as a high pass filter.

I claim:

1. A two terminal high pass filter comprising a pair of inductors, having different values of inductance, inductively coupled together with a coupling coefficient of substantially unity, and two capacitors, connected together between the terminals of the filter as two parallel circuits each including one inductor and one capacitor in series, the inductors being so coupled that from the point of view of current circulating around the two circuits the mutual inductance acts oppositely to self inductance of the inductors.

2. A filter as claimed in claim 1 wherein the ratio of the square roots of values of self inductance of the inductors in the first and the second parallel circuits is equal to the ratio of the capacitance of the capacitors in the second and the first circuits respectively.

3. A filter as claimed in claim 2 wherein the said ratio is greater than 5.

4. A filter as claimed in claim 3 including means to vary the flux sinusoidally through the inductors independently of the inductors themselves to induce alternating voltages in said inductors, whereby a filtered alternating output is obtained from the terminals of the filter.

5. A two terminal high pass filter comprising a pair of inductors $L_1$ and $L_2$ having different values of inductance and a coupling coefficient of substantially unity and two capacitors $C_1$ and $C_2$ having different values of capacitance connected together between the two filter terminals as two parallel circuits of which one comprises inductor $L_1$ and capacitor $C_1$ in series and the other comprises inductor $L_2$ and capacitor $C_2$ in series, the coupling of the inductors being such that the mutual inductance acts oppositely to the self inductance to reduce the voltage available to cause circulating current around the two circuits, whilst the inductance and capacitance values are selected firstly so that the lowest frequency to be passed by the filter is determined by the expression $$\frac{1}{2\pi}\sqrt{\frac{1}{L_1C_1+L_2C_2}}$$

and secondly so that the ratio $$\frac{C_2}{C_1}$$

is equal to the ratio $$\sqrt{\frac{L_1}{L_2}}$$

and is greater than 5.

6. A two terminal filter as claimed in claim 5, wherein the inductors are formed as the alternating current windings of an alternator constructed so that the fundamental alternating frequency which is generated is the lowest frequency to be passed by the filter, whereby the filter circuit ensures a pure sinusoidal alternating current output and the capacitors also perform the function of power factor correction.

References Cited in the file of this patent

UNITED STATES PATENTS

| | | |
|---|---|---|
| 1,284,743 | Merwin et al. | Nov. 12, 1918 |
| 1,362,081 | Chubb | Dec. 14, 1920 |
| 1,920,948 | Crouse | Aug. 1, 1933 |
| 1,998,325 | Lyman | Apr. 16, 1935 |
| 2,569,000 | Hadfield | Sept. 25, 1951 |
| 2,724,062 | Nolde | Nov. 15, 1955 |

FOREIGN PATENTS

| | | |
|---|---|---|
| 410,182 | Great Britain | May 14, 1934 |
| 446,223 | Great Britain | Apr. 27, 1936 |
| 677,932 | Great Britain | Aug. 27, 1952 |
| 724,869 | France | Feb. 5, 1932 |